Sept. 22, 1959  L. U. C. KELLING  2,905,874
POSITION CONTROL SYSTEM AND DEVICE
Filed Oct. 30, 1958  3 Sheets-Sheet 1
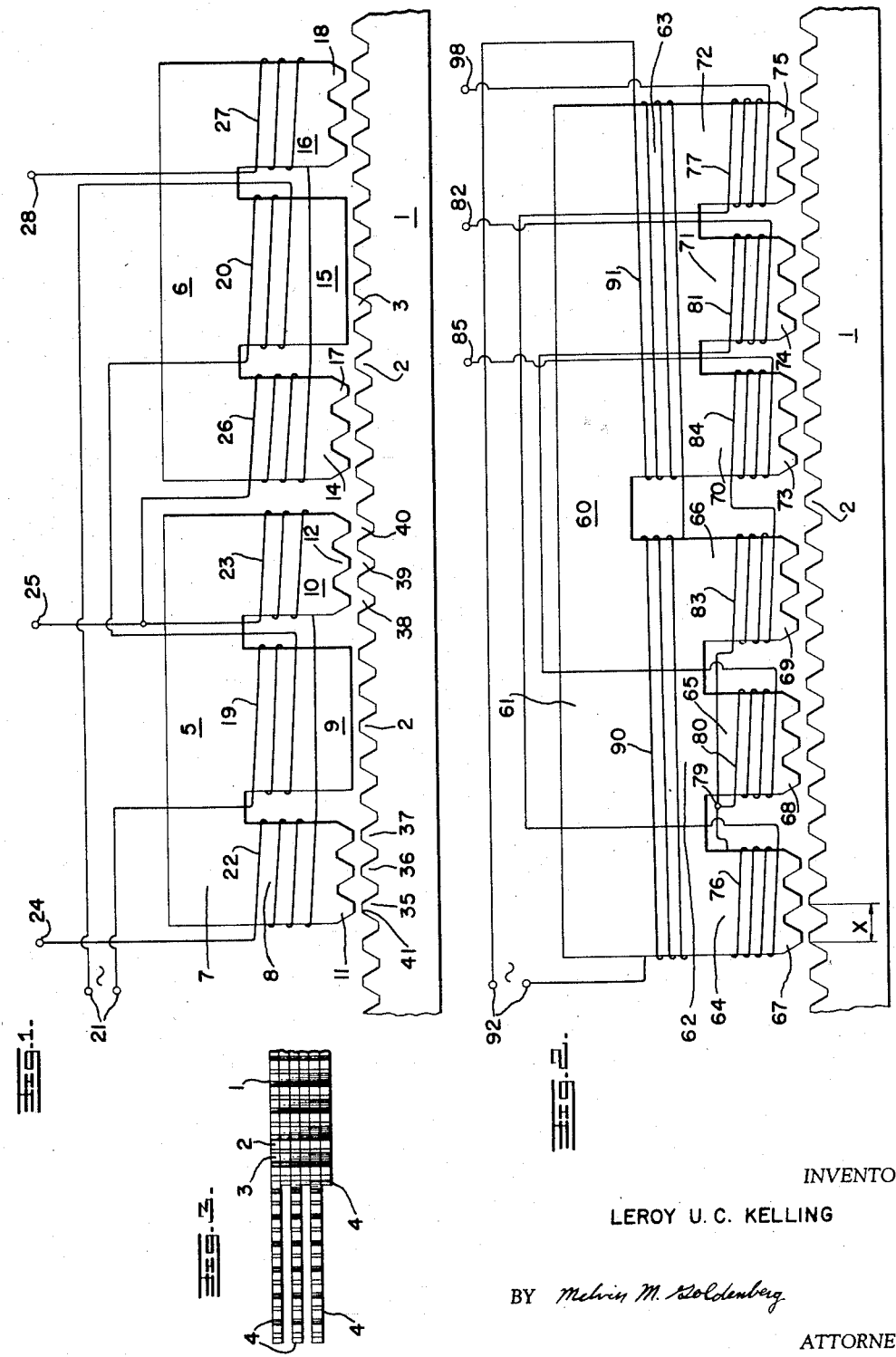
INVENTOR
LEROY U. C. KELLING
BY Melvin M. Goldenberg
ATTORNEY

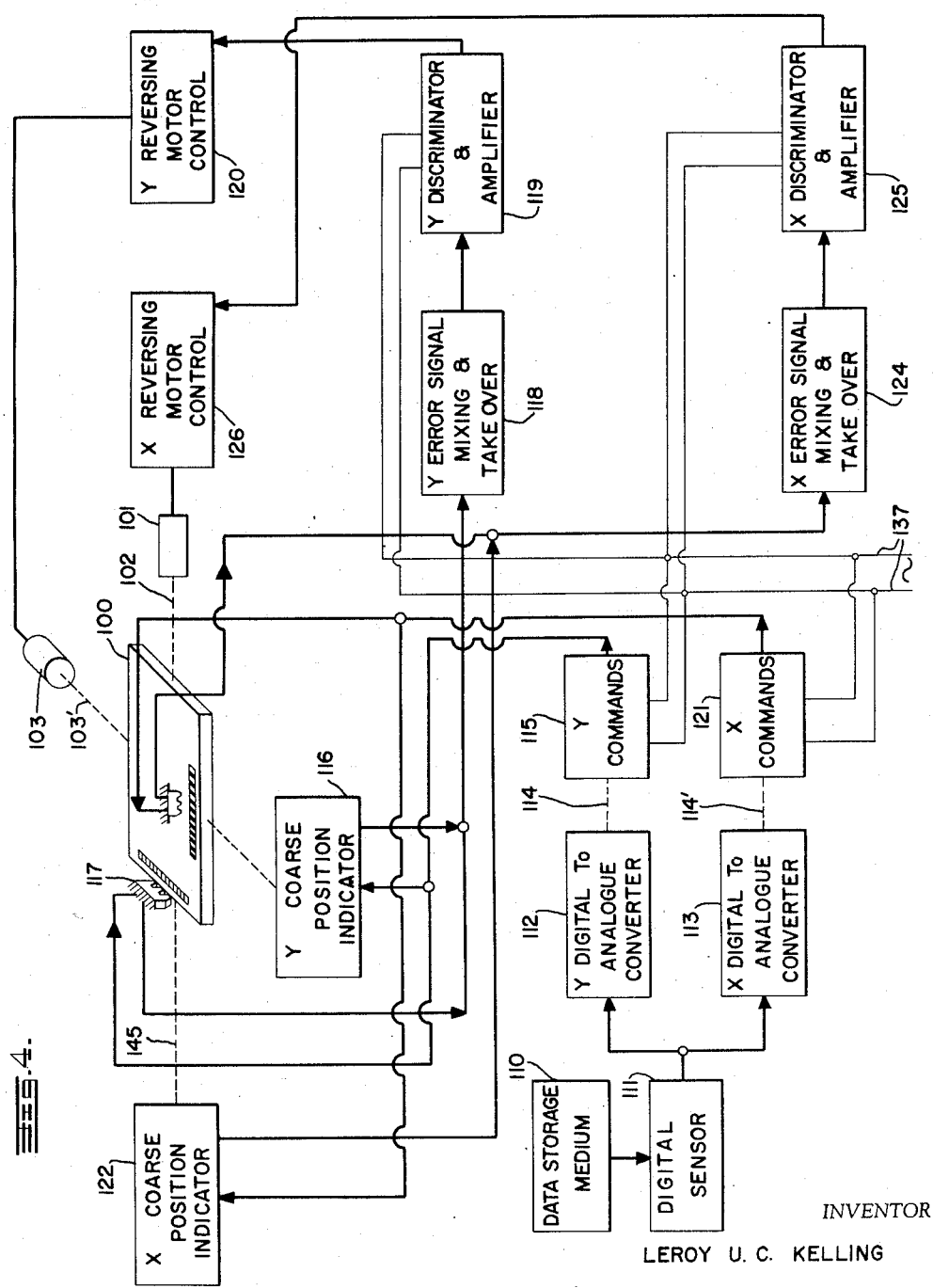

Sept. 22, 1959  L. U. C. KELLING  2,905,874
POSITION CONTROL SYSTEM AND DEVICE
Filed Oct. 30, 1958  3 Sheets-Sheet 3
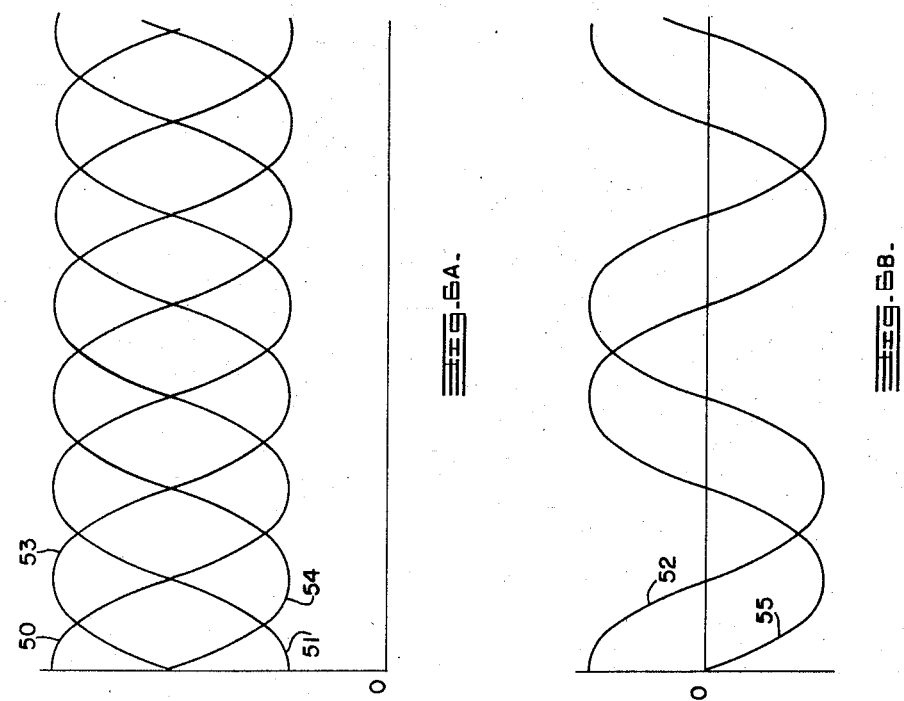
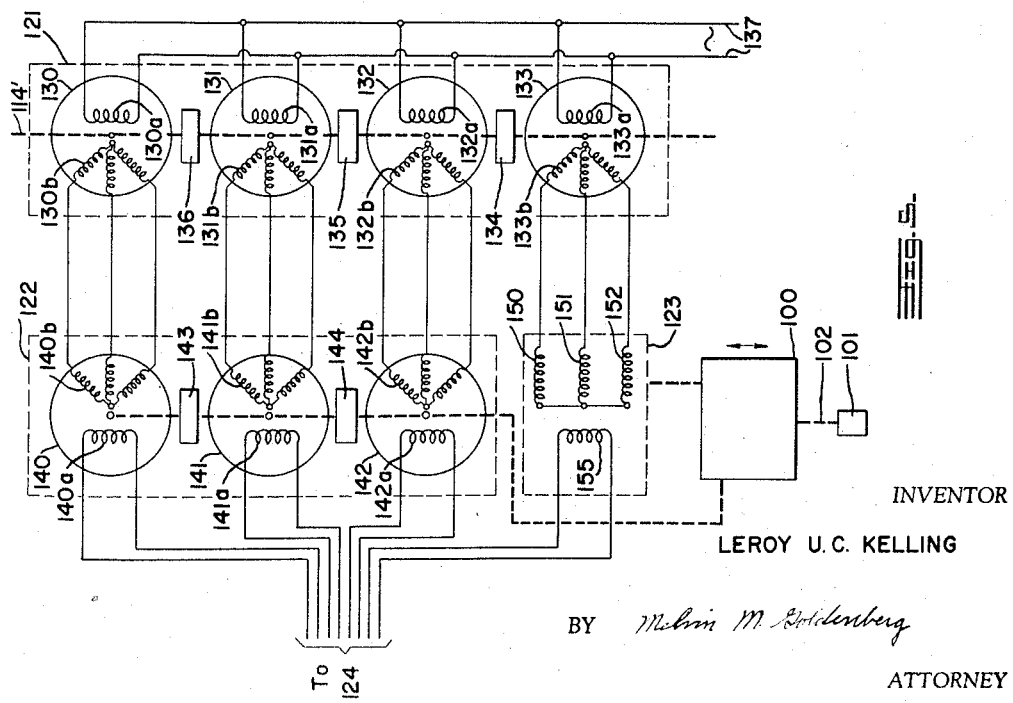
INVENTOR
LEROY U. C. KELLING
BY *Melvin M. Goldenberg*
ATTORNEY

United States Patent Office

2,905,874
Patented Sept. 22, 1959

2,905,874

POSITION CONTROL SYSTEM AND DEVICE

Leroy U. C. Kelling, Waynesboro, Va., assignor to General Electric Company, a corporation of New York Application October 30, 1958, Serial No. 770,727

11 Claims. (Cl. 318—28)

This invention relates to improvements in programmed position control systems and to improvements in position indicating apparatus forming a part of such systems.

It is desirable in the application of position control systems to provide a system which is capable of high degrees of accuracy and resolution. Particularly, in the application of such systems to machine tools there are many instances wherein it is necessary that a high order of accuracy in the electrical system portion of the complete combination be great in order to take full advantage of the capabilities of the combination. Program control systems for controlling the position of an object in space have been proposed utilizing information representing the coordinates of the object stored in various types of data storage media such as punched cards or punched tape. Means are provided to sense the perforations in the medium and to produce electrical signals representative of the information stored therein. The information stored may be in the form of a digital number and the number may either be a straight decimal number or a coded decimal number expressing in inches and decimal parts thereof the distance from a reference point of the desired position of the object for each dimension to be controlled. Thus the position of an object with respect to a reference point may be controlled in any number of dimensions. One such system is that shown in the patent to Kelling et al., No. 2,848,670, issued August 19, 1958, to the assignee of this application. In the system disclosed and claimed in this patent, straight digital information is read from a punched card and electrical signals are developed therefrom which are converted to analogues in the form of shaft rotations, which shaft rotations are used to develop command signals in a plurality of induction devices wherein the command signal developed in each induction device is a voltage representing a digit in the number of inches of the desired position from a reference. Corresponding or counterpart induction devices are provided as feedback elements mechanically connected to the object to indicate its actual position and error signals developed thereby which are proportional to the displacement of the object from the desired position are utilized to control a reversible motor system to urge the object toward the desired position.

It has been found that the resolving power of a system of this type is limited due to the mode of using the synchronous induction devices available. As stated above, the devices are mechanically connected to the object and this is usually accomplished through use of gearing. The gearing may take the form of a rack secured to the object driving gear connected to the devices. Resolving ability is provided by gear reducers between successive induction devices so that as greater degrees of accuracy are required, additional gearing and devices must be provided. This imposes a limitation on such a system because of the problem associated with the provision of gears having their precision and other qualities required.

Therefore, it is an object of this invention to provide a novel program control system utilizing as an element thereof a position responsive transducer capable of precisely measuring small increments of movement in order to enhance the accuracy of a program control system.

It is another object of this invention to provide a novel program control system utilizing a novel position responsive transducer capable of developing voltages to measure very small increments of movement in order to enhance the resolving power of the system.

It is still another object of this invention to provide a novel program control system in which information relating to desired successive positions of an object are derived from a data storage medium and is converted to electrical signals utilized to precisely position the object.

In order to achieve the above objectives, this invention contemplates the provision of a system including a novel position transducing device capable of providing a precise indication of small increments of movement. Similar devices for this purpose have been made available heretofore. However, such devices usually require excitation with a relatively high frequency and low power level signal on the order of 10,000 cycles per second in order to produce an output signal having an amplitude sufficient to be usable in a control system. If a complete system includes elements functioning as coarse position indicators, then it is necessary to provide two signal sources, one of the relatively high frequency for the fine position indicator and another of relatively low frequency for the coarse position indicator. Further, such transducers have been found to be relatively fragile and expensive to fabricate. Also, their nature has been such that they are sensitive to deficiencies in their environment such as temperature changes, dust and vibration.

Accordingly, it is another object of this invention to provide a novel transducing device which is capable of providing an output signal proportional to position when excited by relatively low frequencies, which output signal is of an amplitude such that it can be used in a control system.

It is another object of this invention to provide a novel transducer capable of developing signals for the precise measurement of small increments of movement which is relatively inexpensive to fabricate and is of a rugged construction.

It is still another object of this invention to provide a novel transducer for developing electrical signals which are a precise measurement of small increments of movement which is constructed in such a way as to be relatively impervious to the effects of a poor environment.

It is a further object of this invention to provide a novel transducer for measuring precisely small increments of movement for use as a fine position indicator in position control systems and which utilizes an excitation signal of the same frequency as a coarse position indicator forming a part of such a system which may be provided the same means.

Briefly, the objects of this invention are achieved in one aspect by the provision of a program control system utilizing digital information derived from a data storage medium and converted into an analogue value for each digit in the number so derived and supplied to a number of induction devices including a high-accuracy, position measuring device to program the movement of an object in response to the recorded information. In another aspect, the objects of this invention are achieved by the provision of a position transducer constituted by a pair of relatively movable elements. The first of these elements comprises an elongated bar of magnetic material having a plurality of spaced teeth along one longitudinal side thereof. Confronting this bar, the other element of the transducer comprises a pick-up head having a body portion with a plurality of leg portions extending therefrom. Provided on each leg portion are a plurality of spaced teeth confronting the spaced teeth on the elongated bar. The teeth on any one of the portions are spaced a predetermined distance from the teeth on any other of the leg portions so that when the teeth of the one leg portion overlie an extent of the teeth on the bar together with the spaces therebetween, the teeth on another leg portion will overlie a different extent of the teeth on the bar and the spaces therebetween.

The features of my invention which I believe to be novel are set forth with particularity in the appended claims. My invention itself, however, both as to its organization and method of operation together with further objects and advantages thereof may best be understood by reference to the following description taken in connection with the accompanying drawing, in which:

Figure 1 is a diagrammatic illustration of one embodiment of an aspect of the invention;

Figure 2 is a diagrammatic illustration of an alternative embodiment of the aspect of the invention illustrated in Figure 1;

Figure 3 is an illustration of the details of construction of the aspect of my invention illustrated in Figures 1 and 2;

Figure 4 is a diagrammatic illustration of another aspect of the invention;

Figure 5 is a schematic illustration of a portion of the invention illustrated in Figure 4; and Figures 6A and 6B are graphs of voltages against position of the signals derived by an aspect of the invention.

Figure 1 of the drawing illustrates one embodiment of an aspect of the invention. In this figure, I show on a greatly exaggerated scale an elongated bar 1 formed of a magnetic material. Provided along one longitudinal surface of the bar there are a plurality of raised portions or teeth indicated generally by reference numeral 2 provided with spaces 3 therebetween. The teeth 2 are spaced at regular intervals and in practice may be shaped in an optimum manner so as to produce in cooperation with a pick-up head to be described below, an output signal having a sinusoidal characteristic. Referring briefly to Figure 3 of the drawing, there may be seen an illustration of one mode of fabricating the elongated bar 1. The bar, in this instance, is fabricated by securing together of a plurality of laminations 4 which may be punched or cut from a sheet of magnetic material. Obviously, the bar 1 may be fabricated from a piece of solid material such as magnetic iron or powdered iron material. The laminations 4 are placed in a staggered relationship to each other so that the bar can be made of any desirable length by meshing the ends of one section of laminations with the ends of nother section of the laminations. Referring again to Figure 1, I provide for cooperation with the bar 1 in this embodiment of the invention a pair of pickup heads 5 and 6 also formed by laminations of magnetic material. It has been found desirable to use such laminations to eliminate eddy current losses and to average out defects or differences in the materials which, of course, is well-known in the art. The pick-up head 5 is provided with a body portion 7 having three spaced legs 8, 9 and 10 extending therefrom and toward the bar 1. The legs 8 and 9 are provided with spaced teeth 11 and 12 respectively and the pickup head is disposed in such a manner that the teeth 11 and 12 are spaced a slight distance from the teeth 2 provided on the elongated bar 1, and as the pick-up head 5 and elongated bar 1 are moved relative to each other the teeth will overlie various portions of the confronting teeth 2 and spaces 3 on the bar 1. While the embodiment illustrated shows three teeth per leg, it should be understood that the greater number of teeth per leg the more accurate is the measurement as individual variations are averaged out to a greater extent.

The pick-up head 6 likewise is provided with a body portion 13 and three leg portions 14, 15 and 16 extending therefrom toward the bar 1. In the same manner as pick-up head 5, the legs 14 and 16 of pick-up head 6 are provided with spaced teeth 17 and 18 respectively.

In order to obtain electrical signals from the transducer illustrated in Figure 1 which are proportional in amplitude to the displacement between the teeth 2 and any one group of teeth 11, 12, 17 or 18 provided on the pick-up heads 5 and 6, which one group of teeth may be characterized as a reference and which has a phase displacement with respect to a reference the direction of which indicates the direction of the displacement with the reference teeth to the teeth 2 on the longitudinal bar 1, windings are provided on the pick-up heads 5 and 6. The leg 9 of pick-up head 5 has a winding 19 provided thereon while a winding 20 is provided on the leg 15 of pick-up head 6. The windings 19 and 20 are connected in series with each other and by suitable conductors to the terminals 21. Additional windings 22 and 23 are provided on the legs 8 and 10 respectively, which windings are connected at their extremities to a pair of terminals 24 and 25. As may be seen from an inspection of the drawing, the windings 22 and 23 are placed on the legs 8 and 10 in such a manner that the voltages appearing therein are in phase opposition to each other and therefore buck each other. Similar opposed windings 26 and 27 are connected on the legs 14 and 16 respectively of the pick-up head 6, which windings are connected at one end to the terminal 25 and at the other end to a terminal 28.

From an inspection of the drawing, it may be seen in the relative position of elongated bar 1 and pick-up heads 5 and 6 as shown, when the teeth 11 provided on the leg 8 overlie completely or are coextensive with the confronting teeth 35, 36 and 37 on elongated bar 1, the teeth 12 on the leg 10 overlie or confront spaces 38, 39 and 40 between the adjacent teeth on the bar 1. Thus the teeth 12 are mechanically displaced 180° from the teeth 11. If the teeth 11 are considered as the reference or teeth which are displaced zero degrees and the edge 41 is considered as the leading edge of the teeth 2, it is to be noted that the teeth 14 overlie the rearward or right-hand half of the teeth 2 which they confront and the front or left-hand half of the space between those teeth. Thus the teeth 14 lag the teeth 11 by 90°. Similarly, the teeth 16 overlie the leading or right-hand half of the teeth 2 which they confront and the trailing or left-hand half of the spaces therebetween. Thus the teeth 16 are displaced 270° from the teeth 11.

For an understanding of the operation of this device, reference may now be had to Figures 6A and 6B of the drawing in conjunction with Figure 1. If the coils 19 and 20 are excited with a sinusoidal voltage of a given frequency, it may be seen that the current flowing therethrough will cause flux to be generated in the legs 9 and 15. The flux in leg 9 will cause a flux path to be established which includes the leg 9, the air gap between the teeth 2 on the bar 1 confronting the leg 9, the teeth 35, 36 and 37, the teeth 11 and the leg 8. Flux will also flow in a path including the teeth 2 adjacent the spaces 38, 39 and 40, the teeth 12 and leg 11. It may be seen, however, that due to the positioning of the teeth 11 directly over the teeth 35, 36 and 37, a greater flux will flow in the teeth 11 inasmuch as the air gap and therefore the reluctance is considerably less than that in the path of which the teeth 12 form a part. Therefore, in the relative positions illustrated, a greater amount of flux will flow through the leg 8 than through the leg 10 and the current induced in the winding 22 will be greater than current induced in the winding 23. Thus in the illustrated position, the signal induced in the winding 22 is at a maximum while the signal induced in the winding 23 is at a minimum. As the pick-up head moves to the left as illustrated in the drawing, the teeth 11 pass over the gaps between the teeth which they initially overlay completely while the teeth 12 will overlie to a greater extent the teeth immediately to the left of spaces 38, 39 and 40. As the device moves to the left in the drawing, the signal induced in the winding 22 will decrease as the air gap between the teeth 11 and the teeth 2 increases while the signal induced in the winding 23 will increase as the air gap between the teeth 12 and the teeth 2 decreases. In Figure 6A of the drawing, the curve 50 represents instantaneous values of the envelope bounding the amplitudes of the signals induced in the winding 22 when the winding 19 is excited and as the pick-up head 5 moves to the left, while the curve 51 represents instantaneous values of the envelope bounding the amplitudes of the signals induced in the winding 23 for the same direction of movement. As stated above, the windings 22 and 23 are connected so that the voltages appearing therein oppose each other so that in Figure 6B, the curve 52 drawn to a different scale represents the envelope of the combined signals 50 and 51. Inasmuch as the winding 20 is connected in series with the winding 19 and the teeth 17 are displaced 90° with respect to the teeth 11, the signal induced in the windings 26 and 27 in the illustrated position will be equal and the resultant zero inasmuch as the teeth 18 overlie their confronting teeth 2 to the same extent as do the teeth 17. Thus in Figure 6A, the curve 53 represents the instantaneous values of the envelope bounding the induced voltage in the winding 26 while the curve 54 represents the instantaneous values of the envelope bounding the voltage induced in the winding 27, and inasmuch as the windings 26 and 27 are connected so that the voltages induced therein oppose each other when they are added, the resultant values will be those represented by the curve 55 in Figure 6B. Thus it may be seen that the voltages produced between the terminals 24 and 25 will constitute an alternating signal having the frequency of the signal supplied to the terminals 21 and modulated by the relative movement of the pick-up head 5 and bar 1 to have the amplitudes represented while the signal produced between the terminals 25 and 28 will be alternating in nature and modulated by the relative movement of the pick-up head 6 and bar 1 to have the amplitudes represented by the curve 55.

In the utilization of the device, the pick-up heads 5 and 6 and the bar 1 may be secured to relatively movable parts of a programmed device such as a machine tool and as relative motion therebetween occurs of the extent of the leading edge of one tooth to the leading edge of the next tooth, a signal may be derived which is a measurement of the instantaneous relative positions. When the two pick-up heads 5 and 6 are used, two signals which are related as sine and cosine may be derived. Alternatively, only one of the heads may be used to produce only one signal for comparison with the reference.

While the device has been explained by assuming that the windings 19 and 20 are the excitation windings and that they are the windings supplied with the alternating signal and the modulated output appears at the terminals 24, 25 and 28, it may be seen that the reverse mode of operation may be utilized. Thus if the windings 22, 23, 26 and 27 are supplied with alternating signals having predetermined phase and amplitude relationships, a voltage will be induced in the windings 19 and 20 which is a function of the voltages in the windings 22, 23, 26 and 27 and the relative positions of the pick-up heads 5 and 6 and the bar 1.

In the alternative embodiment of this aspect of the invention illustrated in Figure 2, the teeth 2 on the elongated bar 1 are confronted by a pick-up head 60. The pick-up head 60 is provided with a body portion 61 and two main leg portions 62 and 63. Legs 64, 65 and 66 extend from the main leg portion 62 and are provided with teeth 67, 68 and 69 respectively. Extending from the main leg portion 63 are leg portions 70, 71 and 72 provided with teeth 73, 74 and 75 respectively. A winding 76 is provided on the leg 64 and is connected in series opposition with a winding 77 on the leg 72 which in turn is connected at one end to a terminal 78. The end of the winding 76 not connected to the winding 77 is connected to a neutral point 79. Wound on the leg 65 is a winding 80 connected in series opposition at one end with a winding 81 on the leg 71. The winding 81 is connected at one end to a terminal 82 while the other end of the winding 80 is connected to the neutral point 79. A winding 83 is provided on the leg 66 and is connected at one end in series opposition to a winding 84 on the leg 70 which is connected at its free end to the terminal 85 while the other end of the winding 83 is connected to the junction 79.

In this embodiment, an inspection of the drawing will indicate that the teeth 75 are displaced 180° from the teeth 67. Also, the teeth 68 are displaced 120° from the teeth 67 and 180° from the teeth 74 which are therefore displaced 300° from the teeth 67. The teeth 69 are displaced 240° from the teeth 67 and 180° from the teeth 73 which are therefore displaced 60° from the teeth 67. Wound on the main leg 62 is a coil 90 connected in series with a coil 91 on the main leg 63. The coils 90 and 91 are connected to the terminals 92.

From the foregoing, it may be seen that the envelopes developed by this embodiment are 120° apart. Thus the signal in the winding 76 is at maximum when the signal in the winding 77 is at a minimum and the same situation obtains as regards to the windings 80 and 81 and the windings 83 and 84. When the signals are combined therefore due to the series opposition connection of each set of windings, the resultant is three sine wave envelopes 120° apart. Therefore, the embodiment illustrated in Figure 2 constitutes a three phase position sensitive device whereas the embodiment illustrated in Figure 1 constitutes a two phase position sensitive induction device. Further, it may be seen as with the embodiment of Figure 1, if the excitation voltage is a three phase alternating voltage supplied to the terminals 78, 82 and 85, the signal voltage may be derived from the terminals 92 and will have a phase relationship with respect to the excitation voltage which is a function of the position of the pick-up head 60 with respect to the bar 1. Also, a group of three single phase excitation voltages may be supplied to the terminals 78, 82 and 85 whose envelopes are displaced by 120° and have different amplitudes and a voltage will be induced in the windings 90 and 91 which will have an amplitude and polarity which is a function of the relative position of pick-up head 60 and bar 1 with respect to the command as established by the excitation voltages. This aspect of the invention is therefore similar in its modes of operation and capabilities to a rotary induction device such as a synchro or selsyn.

The ability of this device to provide electrical signals proportional to small increments of movement and therefore accurately indicate the actual position of an object may be understood by an examination of Figure 2. Thus in Figure 2 the distance between the leading edge of any two teeth may be indicated by the quantity X and as the pick-up head 61 travels this distance, a complete cycle of output signals will be provided. This is comparable to a complete rotation of a synchronous transformer such as a selsyn. However, inasmuch as the measurement of very small distances requires that selsyns must be provided with precision gearing or other means coupling them to the object to be measured, considerable opportunities for inaccuracy are introduced whereas in this device, either the bar 1 or pick-up head 61 may be secured directly to the movable element and the teeth associated therewith made very small so that if, for instance, the leading edges of the teeth are separated by a hundredth of an inch and it were only possible to measure accurately the relative movement of the pick-up head 61 and elongated bar 1 for every 3.6° of such movement represented by the curves of the output signals, it would still be possible to measure the movement of an object to .0001" within the spacing within the teeth.

The apparatus thus described constitutes means for developing an electrical signal representative of increments of movement over small distances of travel. In a position program control system wherein the desired range of the system may run to several feet, it is obvious that the apparatus disclosed has particular and unique utility for providing a fine position feedback signal in conjunction with other equipments providing a coarse position feedback signal. The combination of this apparatus would thereby afford an equipment having a considerable range of travel and yet capable of fine resolution and accurate positioning.

Figure 4 of the drawing discloses such a combination of elements. In this figure, the movable device 100 which may be constituted by the table or bed of a machine tool is illustrated as being capable of motion in two dimensions. Thus an X axis positioning motor 101 is mechanically connected to the device 100 as shown at 102 to urge the device 100 in forward and reverse directions on the X axis. A second or Y reversible positioning motor 103 is mechanically connected to the device 100 as shown at 103 to urge it in forward and reverse directions on the Y axis. In formation for controlling the motion of the device 100 may be derived from a suitable data storage medium 110. The data storage medium may take the form of either punched tape or punched cards on which are recorded either in the form of a decimal code or a straight decimal number the X and Y coordinates with reference to a datum point of the position that it is desired to have the device 100 assume. The information is read from the data storage medium by any one of the well-known devices for this purpose and is illustrated generally at 111. Sensors of the type that would be usable at 111 take the form of devices for producing electrical signals usually in the form of numbers of electrical pulses which represent each digit in the numbers of the X and Y coordinates. A suitable digital to analogue converter 112 is provided to convert the digital information from the sensor 111 to analogue values of each digit in each number of the Y coordinate. Such a converter may take the form of the device illustrated in the patent to Kelling et al. 2,848,670 supra. However, other types of digital to analogue converters may be used and may provide the analogue information either in the form of a plurality of values of voltage or as shaft rotations each value or rotation representing a digit in the numerical coordinates of the desired position in the manner shown in the Kelling et al. patent. Also provided is a second digital to analogue converter 113 for converting the information relating to the X axis to analogue values. The Y information is supplied via a connection 114 to a Y command source 115 and from thence to an input to a Y coarse position indicator 116 and to the input terminals of a Y fine position indicator 117. The fine position indicator 117 which is of the type shown in detail in Figures 1 and 2 in conjunction with the coarse position indicator 116 develops error signals which are supplied to a Y error signal mixing and take-over device 118 and from thence to a means for deriving and amplifying a control signal such as the Y discriminator and amplifier 119. The output of the Y discriminator and amplifier is a unidirectional signal the amplitude of which is a function of the displacement of the device 100 from the desired position and the polarity of which is a function of the direction of that displacement. This signal is suppplied to a Y reversing motor control 120 to control the speed and direction of the motor 103.

That much of the system for controlling the motion of the device 100 in the X axis is similar and is constituted by an X command source 121 which is directed by the input shown at 114′ from the X digital to analogue converter 113 and which supplies command signals to the X coarse position indicator 122 and to the X fine position indicator 123. The error signals developed by the coarse and fine position indicators 122 and 123 respectively are supplied to an X error signal mixing and take-over device 124 and from thence to an X discriminator and amplifier 125 which supplies a unidirectional control signal to the X reversing motor control 126 the magnitude of which signal depends on the amount of displacement of the device 100 from its desired X position and the polarity of which signal depends on the direction of that displacement.

Figure 5 of the drawing illustrates in greater detail elements of the system shown in Figure 4. Thus in this figure the X command source may be constituted by a plurality of induction devices 130, 131, 132 and 133 which take the form of synchronous transformers provided with rotors 130a, 131a, 132a and 133a respectively and with stator elements usually having three windings thereon 130b, 131b, 132b and 133b. The input to the X command source 121 in this instance is represented by the dotted line 114′ and as is disclosed in the Kelling et al. patent supra, each of the rotors is positioned by the digital to analogue converter so as to have an analogue value representing a corresponding digit in the X coordinate. With the rotors so positioned, if an alternating excitation voltage is supplied via the conductors 137 to the windings 130a, 131a, 132a and 133a, the windings of each starter 130b, 131b, 132b and 133b will function as the secondary winding of a transformer and have induced therein a voltage the amplitude of which any one stator winding will be a function of the amplitude of the excitation voltage and the position of its respective rotor. As shown in the Kelling et al. patent, the accuracy is increased by the provision of ten-to-one reduction gearing between successive induction devices 134, 135 and 136 so that one-tenth of the rotation of the rotor 133b is added to the rotation of the rotor 132b and so on. Since the position of each rotor 130a, 131a, 132a and 133a represents an analogue of a digit in X coordinate number, then the value of voltages induced in the stator or secondary windings 130b to 133b will be voltages whose amplitudes represent values of successive digits in the X coordinate of the desired position. The voltages induced in each of the stator windings 130b to 133b are coupled by the conductors connecting them to a corresponding induction device provided in the coarse position indicator 122 and in the fine position indicator 123. The coarse position indicators are constituted in this instance by three synchronous induction devices 140, 141 and 142. These devices are similar to the synchronous induction devices provided in the X command source 121 and are provided with rotors 140a, 141a and 142a. The stators are the usual three winding elements 140b, 141b and 142b. The coarse position indicator 122 is mechanically connected to device 100 as shown by the dotted line 145 so that the rotor of the coarsest indicator is arranged to have less than a complete revolution for the maximum movement of the device. The successively less coarse induction position indicating devices are arranged to 10 and 100 times the rotation of the coarsest device by the provision of ten-to-one gears shown schematically at 143 and 144. The fine position indicator may then be effective to measure the precise location of the device 100 within a very small portion of total range of movement.

It may be seen that when the synchronous induction devices in the X command source 121 are excited via the conductors 137, the voltages induced in each one of the stator windings therein is a value of voltage proportional to the digit which the particular device represents in the number representing the desired coordinate. The voltage is transmitted to the corresponding stator windings 140b, 141b and 142b in the X coarse position indicator 122 and a value of voltage is induced in each one of the rotor windings 140a, 141a and 142a, the magnitude and phase of which is a function of the position of the particular rotor winding with respect to its stator winding. Similarly, the X fine position indicator 123 has voltages supplied to each one of its windings 150, 151 and 152 corresponding to the voltages in the windings 133b. The windings 150, 151 and 152 correspond in this instance to the windings 76 and 77, 80 and 81, and 83 and 84 in the device illustrated in Figure 2 of the drawing. Depending upon the relative position of the pick-up head on which the windings 150, 151 and 152 are provided a voltage will be induced in a winding 155 which corresponds to the windings 90 and 91 of the device shown in Figure 2. All of the voltages are induced in the secondary windings 140, 141, 142 and 155 are supplied to the error mixing and take-over device 124 shown in Figure 4. This device may take the form shown in the patent to Kelling 2,764,760, issued September 25, 1956, and assigned to the same assignee as is this application. The voltage supplied to this circuit is therefore an error voltage which is sinusoidal and varies between zero and maximum values related to the displacement of the rotors or movable elements of the induction devices in the position indicators, and is transmitted by the error signal mixing and take-over device 124 in such a manner that the signal from the coarsest induction device will first predominate and be discriminated by the device 125 by comparing it to the phase and amplitude of the excitation voltage supplied via the conductors 137 to control the reversing motor control. As the object to be positioned approaches the desired position, the successively less coarse and lower order induction devices will produce signals which will be effective to be discriminated and provide the control signal.

The particular operation of this system provides that as the object to be positioned approaches very closely the desired position, the signal from the winding 155 of the device 123 will be effective to be discriminated by the device 125 and develop a control signal effective to accurately position the device 100. As stated above, with the provision of relatively small teeth on the elongated bar 1, accurate positioning within a very small distance may be achieved and therefore greater resolving ability of the system is provided.

Although in accordance with the provisions of the Patent Statutes this invention is described as embodied in concrete form and the principle thereof has been explained with the best method in which it is now contemplated applying that principle, it will be understood that the apparatus shown and described is merely illustrative and that the invention is not limited thereto since alterations and modifications will readily suggest themselves to those skilled in the art without departing from the true spirit of this invention or from the scope of the annexed claims.

What I claim as new and desire to secure by Letters Patent of the United States is:

1. A transducer comprising an elongated bar formed from a magnetic material and having regularly spaced raised portions along one longitudinal side thereof, a pick-up head formed of a magnetic material and provided with a body portion and a plurality of leg portions integral with said body portion and extending therefrom, at least some of said leg portions being provided with a plurality of raised portions, said pickup being spaced a slight distance from said elongated bar, said raised portions on each leg being spaced so that the distances between any pair of said raised portions are equal and so that when said raised portions on one of said legs are positioned relative to said elongated bar so that said raised portions of said bar and said one leg are in alignment, said raised portions on any other leg will be displaced from alignment with its confronting raised portions of said elongated bar a predetermined amount, a plurality of windings on said pickup head encompassing said legs, terminal connections for at least one of said windings whereby an excitation voltage may be supplied thereto, and terminal connections for at least another of said windings whereby a signal voltage may be derived therefrom proportional to the relative position of said pickup and said elongated bar.

2. A transducer comprising an elongated bar formed from a magnetic material and having regularly spaced teeth along one longitudinal side thereof, a pick-up head formed from a magnetic material and provided with a body portion and a plurality of leg portions extending from said body portion, each leg portion being provided with a plurality of teeth, said pickup being disposed adjacent said elongated bar with said teeth of said pick-up head confronting said teeth of said elongated bar, said teeth on each said leg being regularly spaced from the other teeth on the same leg, any tooth on any one of said legs being displaced relative to any tooth on any other of said legs so that when said any tooth overlies any portion of confronting teeth and the space therebetween on said elongated bar a tooth on any other of said legs will overlie a different extent of confronting teeth and the space therebetween on said elongated bar, a plurality of windings on said pick-up head, terminal connections for at least one of said windings whereby an excitation voltage may be supplied thereto, and terminal connections for at least another of said windings whereby a signal voltage may be derived therefrom having a magnitude proportional to the displacement of said pick-up head relative to said elongated bar and being shifted in phase in accordance with the direction of said displacement.

3. A transducer comprising an elongated bar formed from magnetic material and having a plurality of regularly spaced teeth along one longitudinal side thereof, a plurality of pick-up heads, each pick-up head being provided with a body portion and a plurality of leg portions extending from said body portions, each leg being provided a plurality of spaced teeth, said pick-up head being disposed so that said spaced teeth on said leg portions confront said spaced teeth on said elongated bar, any tooth on any one of said legs being displaced relative to any tooth on any other of said legs with respect to said teeth in said elongated bar so that when said any tooth overlies any portion of confronting teeth and the space therebetween on said elongated bar a tooth on any other of said legs will overlie a different extent of confronting teeth and the space therebetween, a plurality of windings provided on each pick-up head, terminal connections for at least one of said windings on each of said pick-up heads whereby an excitation voltage may be supplied thereto, and terminal connections on at least another of said windings on each of said pick-up heads whereby a signal voltage proportional to the displacement of said pick-up head relative to said elongated bar may be derived therefrom.

4. A programmed position control system for an object to be controlled comprising a data storage medium, means for deriving electrical signals proportional to digital indicia representing the numerical value of a desired position from said medium, means for converting said electrical signals to analogue values of each digit in said indicia, a coarse position indicator comprising a plurality of induction devices, each induction device having a fixed winding and a movable winding, means for supplying a value of voltage to one of said windings on each induction device corresponding to the analogue value of one of said digits in said indicia, a fine position indicator comprising a fixed element and a movable element, one said element comprising an elongated bar formed of magnetic material having a plurality of spaced teeth along one longitudinal side thereof, the other of said elements comprising a pick-up head having a body portion and a plurality of leg portions extending from said body portion, each leg portion having a plurality of spaced teeth thereon, confronting said teeth on said elongated bar, any one tooth on any one said leg portion being displaced with respect to any other tooth on any other leg portion such that the extent of overlie of the teeth on said elongated bar by the teeth on the other leg portion is different from the extent of overlie by the teeth on any other leg portion, a plurality of windings on said pick-up head, means for supplying a value of voltage corresponding to the analogue value of the least digit in said indicia, and means responsive to the voltage induced in the other windings of said induction devices and said pick-up head to urge said object toward said desired position.

5. A programmed position control system for an object to be controlled comprising a data storage medium, means for deriving electrical signals proportional to the digits in a number expressing a coordinate of the desired position of an object to be controlled, means for converting said electrical signals to analogue values of each digit in said number, a coarse position indicator adapted to be connected to the object being controlled, said coarse position indicator comprising a plurality of devices having movable elements and fixed elements, means for supplying a command voltage to one of said elements representing a digit in said number, a fine position indicator comprising an elongated bar formed of magnetic material having regularly spaced teeth thereon and a pick-up head provided with a plurality of leg portions extending toward said elongated bar, at least some of said leg portions being provided a plurality of teeth extending toward said elongated bar, said leg portions being spaced so that when said teeth on any one leg portion overlie a first extent of confronting teeth on said elongated bar, said teeth on any other leg portion will overlie a different extent of confronting teeth on said elongated bar, a plurality of windings on said pick-up head, means for supplying a command voltage representing the least valued digits in said number to one of said windings, means for deriving a position signal from another of said windings to the other of said elements of each of said devices, and means responsive to said position signals to urge said object toward said desired position.

6. A programmed position control system comprising a data storage medium, means for deriving electrical signals proportional to the digits in numbers representing the coordinates of the desired position of an object, means for converting said electrical signals to analogue values of each digit in said numbers, means for developing command voltages from said analogue values, coarse position indicating means adapted to be connected to said object for developing voltages representative of the actual position of said object, fine position indicating means comprising an elongated bar of magnetic material adapted to be connected to said object and having a plurality of regularly spaced teeth on one longitudinal side thereof and a relatively fixed pick-up head, said pick-up head having a plurality of legs extending therefrom toward said elongated bar, at least some of said legs having spaced teeth thereon, the teeth on each leg being positioned relative to teeth on any other leg so that the extent of overlie of the teeth of any one leg with confronting teeth on said elongated bar is different from the extent of overlie of the teeth on any other leg with the confronting teeth on said elongated bar, a plurality of windings on said pick-up head, one of said windings developing a voltage representative of the actual position of said object, and means responsive to said command voltages and said actual position voltage to urge said object toward said desired position.

7. A programmed position control system comprising a data storage medium, means for deriving electrical signals proportional to the digits in a number representing the coordinate of the desired position of an object, means for converting said electrical signals to analogue values of each digits in said number, means for developing a command voltage from each of said analogue values, a coarse position indicator comprising a plurality of position indicating devices, means connecting said devices to said object and to each other to provide for successively more precise indications of the actual position of said object, a fine position indicator comprising a fixed element and a movable element, one of said elements being connected to said object, means on said position indicators to develop voltages representative of the actual position of said object and means responsive to successive differences between said command voltages and said position voltage to urge said object toward said desired position.

8. Position measuring apparatus comprising an elongated bar formed from magnetic material and having a plurality of regularly spaced teeth along one longitudinal side thereof, a pick-up head comprising a body portion having three legs extending therefrom toward said elongated bar, two of said legs having a plurality of spaced teeth provided thereon, said two legs being disposed on opposite sides of the third leg, said two legs being spaced from each other so that when the teeth of one of said two legs overlie a first extent of confronting teeth on said bar the teeth on the other of said two legs overlie a different extent of confronting teeth on said elongated bar, a winding on each of said two legs, said windings being connected in series opposition to each other and to terminal means, and a winding on said third leg connected to terminal means.

9. Position measuring apparatus comprising an elongated bar formed from magnetic material and having a plurality of regularly spaced teeth along one longitudinal side thereof, a pair of pick-up heads, each pick-up head comprising a body portion having three legs extending therefrom toward said elongated bar, two of said legs having a plurality of spaced teeth provided thereon, said two legs being disposed on opposite sides of the third leg, said two legs being spaced from each other so that when the teeth of one of said two legs overlie a first extent of confronting teeth on said bar the teeth on the other of said two legs overlie a different extent of confronting teeth on said elongated bar, a winding on each of said two legs, said windings being connected in series opposition to each other and to terminal means, and a winding on said third leg connected to terminal means.

10. Position measuring apparatus comprising an elongated bar formed from magnetic material and having a plurality of regularly spaced teeth along one longitudinal side thereof, a pick-up head comprising a body portion and a pair of main leg portions extending therefrom, three legs extending from each main leg portion, each leg having a plurality of spaced teeth provided thereon, said legs being spaced from each other so that when the teeth on one of said legs overlie a first extent of confronting teeth on said elongated bar the teeth on each of the other of said legs overlie a different extent of confronting teeth on said elongated bar, a winding on each leg, one of said windings on one of said legs being connected in series opposition with a winding on another of said legs and a winding on each main leg portion connected in series with each other.

11. A position measuring device as defined in claim 10 wherein a polyphase excitation is supplied to said windings on said legs and a single phase signal displaced in phase with respect to a reference signal by an amount which is a function of a position error is derived from said windings on said main leg portions.

No references cited.

UNITED STATES PATENT OFFICE

CERTIFICATE OF CORRECTION

Patent No. 2,905,874 September 22, 1959

Leroy U. C. Kelling

It is hereby certified that error appears in the printed specification of the above numbered patent requiring correction and that the said Letters Patent should read as corrected below.

Column 1, line 66, after "driving" insert -- a --; column 2, line 1, for "gears having theh precision" read -- gears having the precision --; column 7, line 31, for "In formation" read -- Information --; line 75, for "suppplied" read -- supplied --; column 8, line 35, for "starter" read -- stator --; column 12, line 6, for "digits" read -- digit --.

Signed and sealed this 22nd day of March 1960.

(SEAL)
Attest:

KARL H. AXLINE
Attesting Officer

ROBERT C. WATSON
Commissioner of Patents